UNITED STATES PATENT OFFICE.

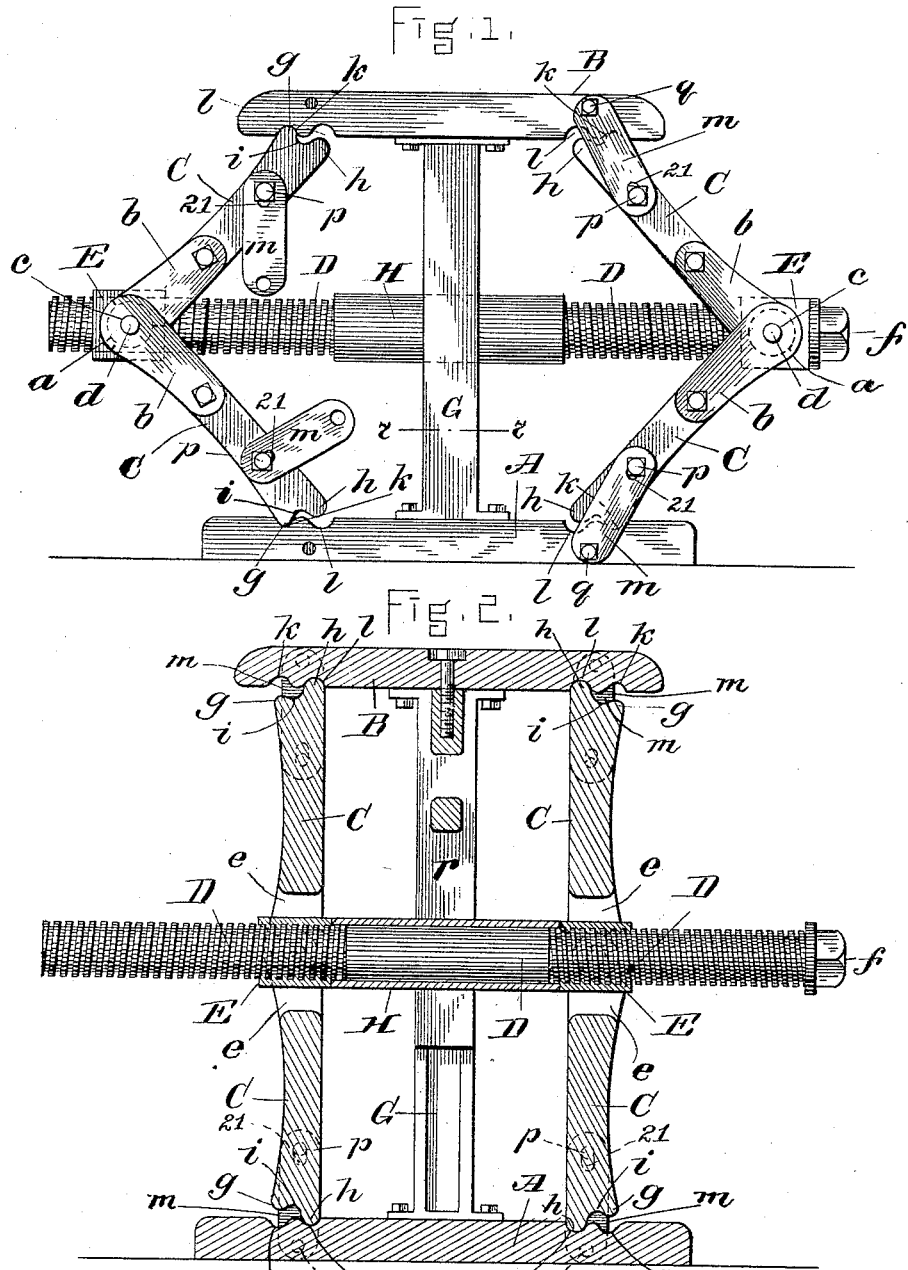

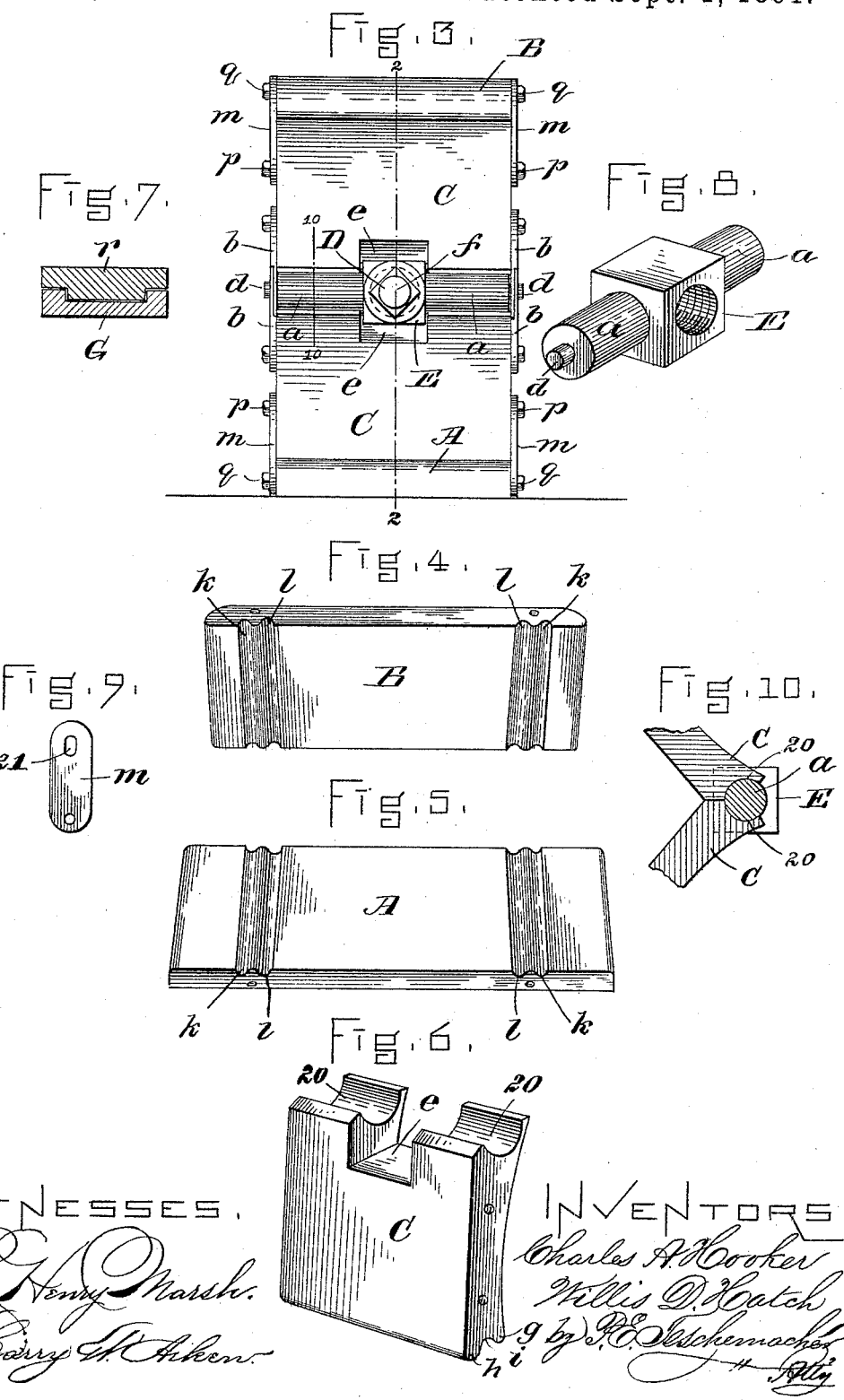

CHARLES ALBERT HOOKER AND WILLIS D. HATCH, OF BATH, MAINE.

LIFTING-JACK.

SPECIFICATION forming part of Letters Patent No. 458,847, dated September 1, 1891.

Application filed July 11, 1891. Serial No. 399,221. (No model.)

*To all whom it may concern:*

Be it known that we, CHARLES ALBERT HOOKER and WILLIS D. HATCH, citizens of the United States, and residents of Bath, in the county of Sagadahoc and State of Maine, have invented certain Improvements in Lifting-Jacks, of which the following is a full, clear, and exact description, reference being had to the accompanying drawings, making part of this specification, in which—

Figure 1 is a side elevation of a lifting-jack constructed in accordance with our invention, the parts being in their lowest position. Fig. 2 is a longitudinal vertical section of the same on the line 2 2 of Fig. 3, the parts being in the highest position. Fig. 3 is an end elevation of the same. Figs. 4 and 5 are perspective views of the lifting-head and bed-plate. Fig. 6 is a perspective view of one of the toggle-levers. Fig. 7 is a section on the line 7 7 of Fig. 1; Figs. 8 and 9, details to be referred to. Fig. 10 is a section on the line 10 10 of Fig. 3.

Our invention has for its object to provide a simple, powerful, and effective lifting apparatus embodying the well-known mechanical principle of the toggle-joint and screw combined; and our invention consists in certain peculiarities of construction and combinations of parts, as hereinafter fully set forth, and specifically pointed out in the claims.

In the said drawings, A represents the bed-plate of the apparatus, and B the lifting-head, between which are arranged four wide toggle bars or levers C C C C, knuckled or jointed together in pairs, as shown, and operated by a horizontal actuating screw-shaft D, provided on opposite sides of its central smooth portion with right and left hand threads, upon each of which is fitted a heavy nut E, provided with lateral trunnions $a$, Figs. 3 and 8, the adjacent ends of the two toggle-levers C C, which form a pair, being transversely grooved, as seen at 20, to adapt them to fit the upper and lower sides of said trunnions, as seen in Fig. 10, upon which they are held and at the same time secured together by metal straps $b\ b$, secured to the opposite sides of the levers and each provided with an aperture $c$ to enable it to fit over a stud $d$, projecting from the outer end of the trunnion $a$, a simple, strong, and durable knuckle-joint being thus formed, which will admit of the two levers thus connected being easily taken apart when required. The central portion of each lever C at the joint is cut away to form an aperture $e$ for the reception of the nut E, said apertures being of sufficient size to permit of the free movement of the toggle-levers without interfering with the nut. The actuating screw-shaft D is squared at one or both ends, as at $f$, or otherwise adapted to be provided with a removable crank-handle, wrench, or ratchet-lever, by means of which rotation in the desired direction is imparted to the screw-shaft.

Each of the toggle bars or levers C is provided at the end opposite to the joint with two rounded bearing-edges $g\ h$, extending the entire width of the lever and separated from each other by a deep groove $i$, the inner bearing-edge $h$ being at a greater distance from the center or knuckle-joint than the outer bearing-edge $g$. These two bearing-edges are adapted to fit within two transverse grooves $k\ l$ in the bed-plate A or the lifting-head B, as seen in Figs. 1, 2, 4, and 5, the two levers of each pair being held in place and connected with the said bed-plate and lifting-head on each side by means of straps $m$ and screws $p\ q$.

The operation of the toggle-levers having the double bearing-edges is as follows: When the toggles are at the lowest point, as seen in Fig. 1, the outer bearing-edges $g$ of the levers C engage with and rest in the bottoms of the outer grooves $k$ in the bed-plate and lifting-head, said bearing-edges taking the weight of the load. As the toggles are straightened by the action of the screw-shaft D in raising the load the inner bearing-edges $h$ are brought into contact with the bottoms of the inner grooves $l$, thus relieving the bearing-edges $g$ of the weight of the load, and as the toggles continue to be straightened the lifting-head is raised by the edges $h$ to a higher point than would be possible with single bearing-edges or ordinary pivots or joints by reason of the edges $h$ being further from the centers or knuckle-joints than the edges $g$, and it will furthermore be seen that this additional rise will be effected at the most advantageous time—that is, when the toggles are nearly straight and the greatest possible leverage is being exerted to raise the load. As soon as the weight of the load is taken by the bearing-edges $h$ the edges $g$ commence to be withdrawn from their grooves, the parts assuming the position seen in Fig. 2 when the toggles are fully straightened out. At whatever period between the lowest and highest points of elevation it is desired to leave the load, it will be obvious that it will be firmly supported without any liability of slip or change of position. The straps $m$, which connect the toggle-levers with the bed-plate and the lifting-head, are each slotted at the end which is secured to the toggle-lever, as seen at 21, Figs. 1 and 9, in order to afford a slight play or loose motion at this point, as is required when the bearing-edges $h$ farthest removed from the center take the weight of the load and commence to act. By thus providing the toggle bars or levers C each with two bearing-edges $g$ $h$, located the inner one at a greater distance from the center than the outer one and engaging successively with separate transverse grooves $k$ $l$ in the bed-plate and lifting-head, as above described, a great advantage is gained over the ordinary method of pivoting the ends of the toggle-levers, as we are not only enabled to lift the load to a greater height, as described, but also to reduce the acuteness of the angle at the joint between the two levers of a pair when the toggle is at the lowest point, thus reducing the strain on the actuating-screw when the load first commences to be lifted.

G G are two grooved guide posts or uprights rising from the bed A, one on each side, with which engage guide-bars $r$, firmly secured to and depending from the lifting-head B, these guides serving to keep the actuating screw-shaft in position and steady the lifting-head and prevent it from being forced over to one side or the other of the center under the weight of the load being lifted. The central smooth portion of the screw-shaft G between the right and left hand threads is encircled by a sleeve or tube H, which is free to slide longitudinally thereon, said sleeve forming a stop, against the ends of which the nuts E are brought into contact when the toggles are raised to their highest point, thus preventing said toggles from being carried beyond the center.

What we claim as our invention, and desire to secure by Letters Patent, is—

1. In a lifting-jack, the combination, with the bed-plate and lifting-head and a right and left handed screw-shaft, of four toggle-levers connected in pairs and operated by nuts carried by said screw-shaft, each of said toggle-levers being provided at the end opposite to the knuckle-joint with two separate bearing-edges adapted to successively engage corresponding transverse grooves in the bed or lifting-head, the inner bearing-edge being located at a greater distance from the center or knuckle-joint than the outer bearing-edge, whereby the said two bearing-edges are caused to take the weight of the load in succession and thereby increase the upward movement of the lifting-head as the toggle-levers are straightened and reduce the acuteness of the angle at the knuckle-joints when the toggles are at the lowest point, substantially as set forth.

2. In a lifting-jack, the combination, with the bed-plate A, lifting-head B, and the right and left handed screw-shaft D, of toggle-levers connected in pairs and operated by nuts carried by said screw-shaft, said levers being provided with bearing-edges engaging with transverse grooves in the bed-plate and lifting-head, and pivoted straps $m$ for securing the ends of the levers to the said bed-plate and lifting-head, substantially as set forth.

3. In a lifting-jack, the combination, with the bed-plate A, lifting-head B, and the right and left handed screw-shaft D, of the toggle-levers C, connected in pairs and operated by nuts carried by said screw-shaft, said levers being provided with bearing-edges $g$ $h$, adapted to engage with transverse grooves $k$ $l$ in the bed-plate and lifting-head and being connected with said bed-plate and lifting-head by pivoted straps $m$, and the vertical guides G $r$, arranged between the two pairs of toggle-levers, all constructed and arranged to operate substantially in the manner and for the purpose described.

4. In a lifting-jack, the combination, with the bed-plate A, lifting-head B, and the right and left handed screw-shaft D, of the nuts E E, provided with trunnions $a$, the toggle-levers C, grooved at their joints to fit upon opposite sides of the trunnions $a$ and having apertures $e$ for the nuts, said levers being connected together by pivoted straps $b$ $b$, having apertures $c$ and fitting over studs $d$, projecting from the ends of the trunnions $a$, and the pivoted straps $m$, connecting the toggle-levers with the bed-plate A and lifting-head B, all constructed to operate substantially in the manner and for the purpose set forth.

Witness our hands this 7th day of July, A. D. 1891.

CHARLES ALBERT HOOKER.
WILLIS D. HATCH.

In presence of—
J. D. ROBINSON,
WM. T. HARDIE.